April 9, 1929.  F. GLASS  1,708,836
BEARING HOLDER
Filed July 21, 1928  2 Sheets-Sheet 2
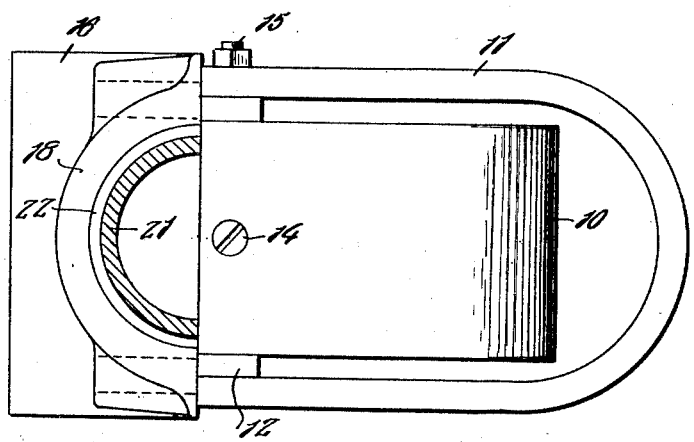
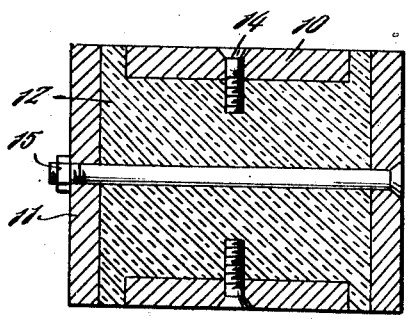
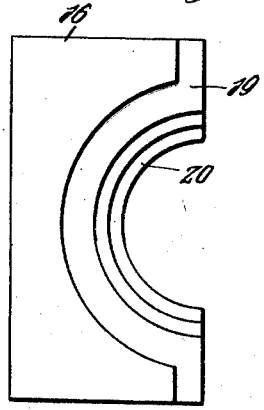
Frederick Glass
INVENTOR
BY Victor J. Evans
ATTORNEY Patented Apr. 9, 1929.

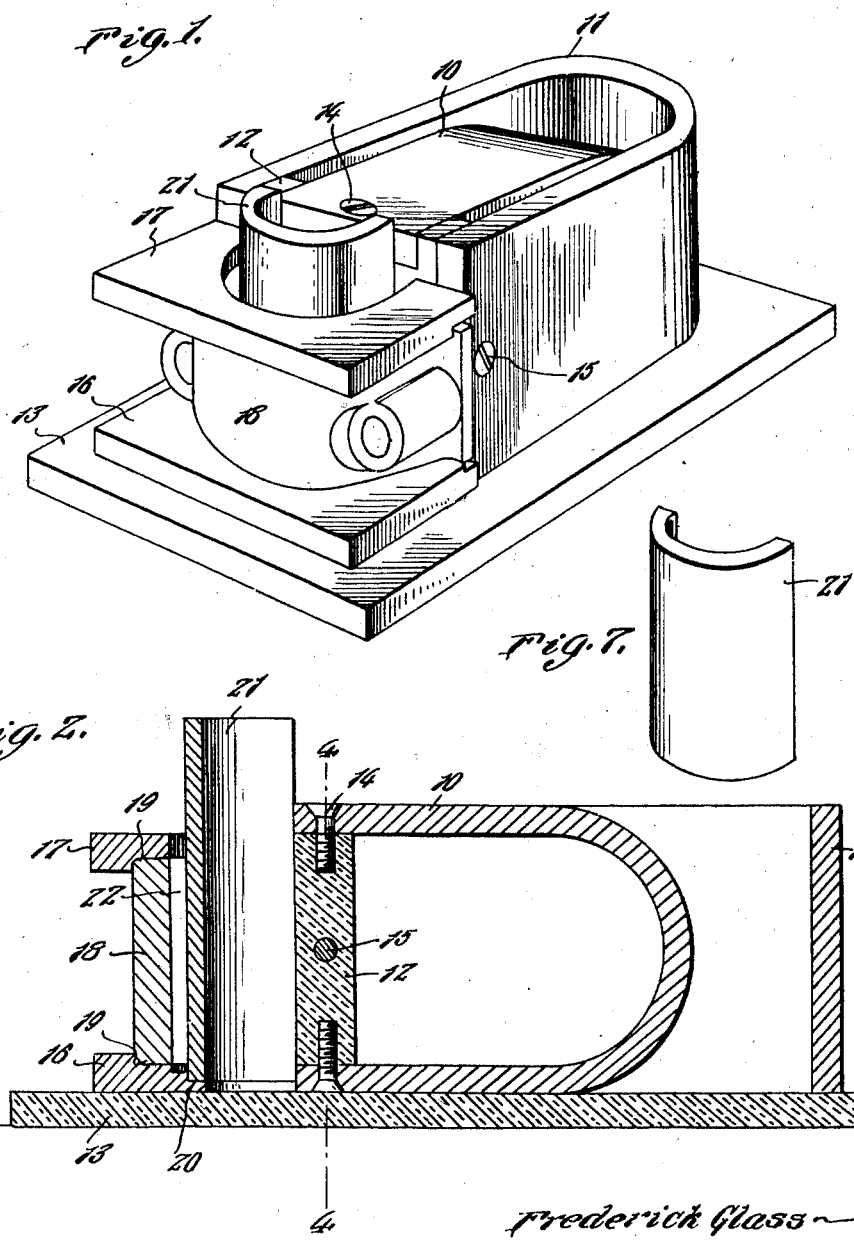

1,708,836

UNITED STATES PATENT OFFICE.

FREDERICK GLASS, OF MIAMI, FLORIDA.

BEARING HOLDER.

Application filed July 21, 1928. Serial No. 294,538.

This invention relates to bearing holders and has for an object the provision of a device for holding a bearing and a mandrel in position to facilitate pouring Babbitt or other soft metal into the bearing.

Another object of the invention is the provision of a holder by means of which each half of the bearing may be separately poured so as to eliminate the necessity of cutting and filing the poured bearing, as now required where the entire bearing is poured in cylindrical form.

Another object of the invention is the provision of a holder wherein the bearing, mandrel and mandrel plates are securely held in place without the use of a vise or clamp, the holding means permitting of the ready assembling or separation of the parts in a manner to reduce the amount of time and labor necessary for the operation, yet acting to hold the parts in proper position while the bearing is being poured.

With the above and other objects in view, the invention further includes the following novel features and details of construction, to be hereinafter more fully described, illustrated in the accompanying drawings and pointed out in the appended claims.

In the drawings:—

Figure 1 is a perspective view of the invention with a bearing in position.

Figure 2 is a vertical longitudinal sectional view.

Figure 3 is a plan view showing the mandrel in transverse section.

Figure 4 is a section on the line 4—4 of Figure 2.

Figure 5 is an inner face view of the bottom plate.

Figure 6 is a similar view of the top plate.

Figure 7 is a detail perspective view of the mandrel.

Referring to the drawings in detail wherein like characters of reference denote corresponding parts, the reference characters 10 and 11 indicate a pair of magnets, the magnet 10 being arranged within the magnet 11. These magnets are shown as of the permanent horseshoe type, but electromagnets may be substituted if desired.

The magnets are arranged with their pole pieces flush and are held in position by means of a connecting plate or member 12 which is formed of suitable non-conducting material, such as will not be attracted by the magnets.

The magnets are positioned upon a base 13 which may be formed of a material similar to the plate 12. The magnet 10 has its opposite pole pieces connected to the plate 12 by means of screws 14, while a screw or bolt 15 serves to connect the magnet 11 to the plate 12. The faces of the pole pieces and the plate are flush.

Adapted to be engaged and held by the magnet 11 are plates 16 and 17 of magnetic material, the former being the bottom plate while the latter or top plate is spaced above the bottom plate so as to provide for the reception of one half of a bearing 18. The plates 16 and 17 are each provided with a seat 19 which receives the opposite ends of the bearing as shown in Figure 2, while the plate 16 is provided with an additional seat 20 arranged concentric with the seat 19. This seat 20 is adapted to receive a core or mandrel 21 which may also be of magnetic material and is so positioned that the outer surface of the mandrel will be spaced from the inner face of the bearing 18 so as to provide a space 22 to receive Babbitt or other soft metal. As the mandrel plates 16 and 17 and magnets 10 and 11 act to hold the bearing 18 and mandrel 21 properly spaced, the Babbitt metal or bushing will be evenly distributed throughout the inner face of the bearing. Each half of a bearing may thus be bushed or poured separately, so that a semi-circular bushing is provided without the necessity of cutting and filing a cylindrical bushing.

The invention is susceptible of various changes in its form, proportions and minor details of construction and the right is herein reserved to make such changes as properly fall within the scope of the appended claims.

Having described the invention what is claimed is:—

1. A bearing holder comprising spaced plates adapted to receive a bearing between them, a mandrel, spaced from the inner face of the bearing, and magnetic means to hold the plates, mandrel and bearing in position to facilitate pouring a bearing.

2. A bearing holder comprising spaced plates adapted to receive a bearing between them, means included in the plates to provide a seat for the bearing, a mandrel, means to position the mandrel spaced from the inner face of the bearing and magnetic means to hold the plates, mandrel and bearing in position to facilitate pouring a bearing.

3. A bearing holder comprising spaced plates adapted to receive a bearing between them, means included in the plates to provide a seat for the bearing, a mandrel, means to position the mandrel spaced from the inner face of the bearing and magnets having their poles arranged in the same plane for contact by the plates, mandrel and bearing to hold the same in position while pouring a bearing.

4. A bearing holder comprising spaced plates adapted to receive a bearing between them, means included in the plates to provide a seat for the bearing, a mandrel, means included in one of the plates to provide a seat for the mandrel and space the latter concentrically from the inner face of the bearing, and magnetic means to hold the plates, mandrel and bearing in position to facilitate pouring a bearing.

5. A bearing holder comprising a pair of horseshoe magnets arranged one within the other with their poles flush, spaced plates adapted to be attracted by and have their outer edges engaged with the poles of one of the magnets, seats provided in the opposite faces of the plates to receive one-half of a bearing, a mandrel adapted to be attracted by and span the poles of the other magnet, and a seat provided in one of the plates to receive one end of the mandrel to concentrically space the latter from the inner face of the bearing.

In testimony whereof I affix my signature.

FREDERICK GLASS.